July 19, 1960  W. H. MITCHELL  2,945,729
LUBRICATING OIL RETURN SYSTEM FOR SLEEVE BEARINGS
Filed Nov. 15, 1957

WITNESSES:
Bernard R. Gieguey
Ernest P. Klipfel

INVENTOR
William H. Mitchell
BY
ATTORNEY

United States Patent Office 2,945,729
Patented July 19, 1960

2,945,729

LUBRICATING OIL RETURN SYSTEM FOR SLEEVE BEARINGS

William H. Mitchell, Lima, Ohio, assignor to Westinghouse Electric Corporation, East Pittsburgh, Pa., a corporation of Pennsylvania Filed Nov. 15, 1957, Ser. No. 696,859

4 Claims. (Cl. 308—132)

My invention relates to dynamoelectric machines and particularly, relates to a novel lubricating oil system for sleeve-type bearings.

The conventional method of lubricating sleeve-type bearings such as are used in small dynamoelectric machines, provides for the recirculation of oil from the bearing clearance space by collecting the oil escaping from the bearing clearance space in a cavity external to the bearing itself. The oil is then returned from the cavity to wicking packed around the bearing by means of a groove or slot formed in any convenient place in the bearing housing or support. Capillary attraction within the wicking then causes the oil to rise upward to a window or opening at the top of the bearing returning the oil to the bearing clearance space for a continuous circulation of the oil.

Many such conventional oil recirculating systems are insufficient because the return path from the bearing clearance space is inadequate for the proper amount of return oil. Generally, the return groove or slot and the wick return area are of such sizes as to be unable to return oil to the bearing clearance space at the same rate of flow as the oil leaving the bearing clearance space. The inadequacy of the return slot or the inadequacy of the wick return area usually results in flooding of the collection cavity outside the bearing cup, with resultant oil leakage along the shaft of the machine to the connected load or in the opposite direction of the shaft to the internal windings of the machine. Such leakage could result in the premature failure of the machine. Such conventional designs may not be dependable when the machine is mounted other than horizontally on a level base since the flow of oil through the groove or slot is generally dependent upon gravity feed.

Many conventional lubricating oil recirculating systems have insufficient oil capacity when applied to small dynamoelectric machines of either high power rating or large bearing loads or both. These systems have no flexibility for adding additional oil capacity should high power or large bearing loads be desired, or should a lubricating system be desired that can function for an extended time without reoiling. Thus, the usual type of recirculating oil systems used for small dynamoelectric machines has numerous disadvantages.

An object of my invention is to provide a lubricating oil return system for sleeve bearings with an adequate wick return area so that the oil pumped from the bearing clearance space will be carried away from the bearing and returned to the bearing clearance space with a minimum of oil loss or leakage.

Another object of my invention is to provide a lubricant return system allowing the mounting of the dynamoelectric machine in any position.

Another object of my invention is to provide a lubricating oil return system with flexibility for increasing or decreasing the size of the oil reservoir whenever the rating of the dynamoelectric machine or the desired length of time without reoiling so requires.

These and other objects and advantages of my invention will be more readily understood from the following detailed description, taken in connection with the accompanying drawings, in which.

Figure 1:
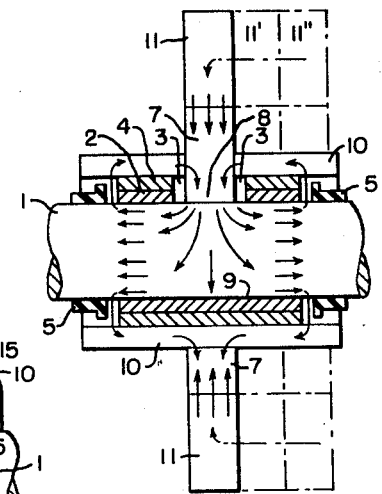
Figure 1 is a diagrammatic illustration of the principles of my invention showing the relative location of the oil transmitting means employed and the oil flow resulting therefrom.

Fig. 1 diagrammatically illustrates the principles employed in my invention, wherein a rotating shaft 1 is supported by a sleeve bearing 2. Oil transmitting means, herein shown as wicks, are disposed about the sleeve bearing 2 making direct contact with the shaft 1 through a window 3 in the bearing. Flingers 5 are mounted on the shaft 1 at each end adjacent to the sleeve bearing 2.

The oil transmitting means is shown as consisting of wicking but any suitable feeding means could be used which provides a capillary flow of oil. A feed wick 7 having a contacting tongue 8 extended through the window 3 feeds lubricating oil directly to the bearing clearance space 9. An oil return wick 10 is disposed around the circumferential surface of the bearing 2. The wick 10 has a continuous annular surface extending beyond the ends of the sleeve bearing 2 providing a large area for receiving oil discharged from the bearing. The oil return wick 10 is preferably less dense than the feed wick 7, that is, it has larger capillary passages tending to give off lubricant oil to the feed wick 7. The flow of lubricant within my oil return system has been indicated by means of arrows shown in the figures. The adhesive forces between the oil flowing from the wicking and the rotating shaft act upon the contacting tongue 8 of the feed wick 7 withdrawing lubricant therefrom in a mixed circumferential and axial flow in the bearing clearance space 9, as indicated by the curved arrows. The steady-state axial flow or end leakage from the bearing 2 is indicated by the horizontal arrows on the bearing clearance space 9. When the axially flowing oil reaches the flingers 5, the lubricant oil is directed in a radial direction amounting to a 90° change in direction. The lubricant oil then flows radially along the face of the flinger 5 and is subjected to sufficient force so that it leaves the face of the flinger 5 at its outside diameter with a radial velocity sufficient to cause it to reach the internal surface of the return wick 10.

In accordance with the present invention, sufficient receiving area is assured for the receipt of the returning oil by the extension of the continuous annular surface of the return wick 10 beyond the end of the bearing cup 4 and flingers 5. Capillary attraction causes the lubricant oil to flow in all directions in the oil return wick 10, but in particular, towards the feed wick 7. Feed wick 7 having relatively small capillary passages will always draw lubricant oil from the oil return wick 10 which has relatively large capillary passages. Because the oil return wick 10 has a relatively low capillary force in comparison with the feed wick 7, the flow of lubricant oil will always be from the oil return wick 10 to the feed wick 7. The feed wick 7 will be relatively unsaturated with lubricating oil in the area of its contacting tongue 8 because it is continuously giving up lubricant oil to the bearing clearance space 9. The feed wick 7, therefore, continuously draws lubricant oil from the oil return wick 10, which oil is attracted to the contacting tongue 8 and hence to the bearing clearance space 9 for recirculation.

The steady-state equilibrium saturation level of the feed wick 7 will decrease slowly due to evaporation and oil creepage so that means for supplying additional oil thereto is usually desirable. For this reason, an oil feeding means illustrated as an oil reservoir wick 11, shaped in the form of a washer with an internal diameter capable of receiving the feed wick 7, is mounted over the feed wick 7. The oil reservoir wick 11 has relatively large capillary passages with consequent low capillary force and functions similarly to the oil return wick 10. A balancing flow of lubricant oil drawn from the reservoir wick 11 radially into the feed wick 7 as indicated by the vertical arrows in Fig. 1, will tend to bring the steady-state equilibrium flow to its initial level, thereby keeping the flow of lubricant oil at a proper rate. Additional oil reservoir wicks 11' and 11'' may be added to the oil reservoir wick 11 when desired, thereby increasing the capacity of reservoir oil within my oil return system.

The oil return wick 10 should be designed so that it never saturates in the area where the flingers 5 are located, since this is the area where the lubricant oil is received from the flingers 5 for return to the bearing clearance space 9. All lubricant oil thrown off at the peripheral surface of the flingers 5 must be absorbed by the oil return wick 10. My invention uniquely avoids any tendency to saturate in this region by supplying a sufficient receiving area for the lubricating oil by extending the oil return wick 10 beyond the face of the flingers 5 so that an annular surface of maximum size is in a position to receive the lubricant oil leaving the flingers 5. An adequate receiving surface with sufficient storage volume provides sufficient path to return the oil at the same rate at which it escapes from the bearing. The relative percentage of saturation and gradient of capillary force between the oil return wick 10 and the feed wick 7 are made sufficient to obtain a good capillary attraction gradient for returning the lubricant oil to the feed wick 7 for recirculation.

Figure 2:
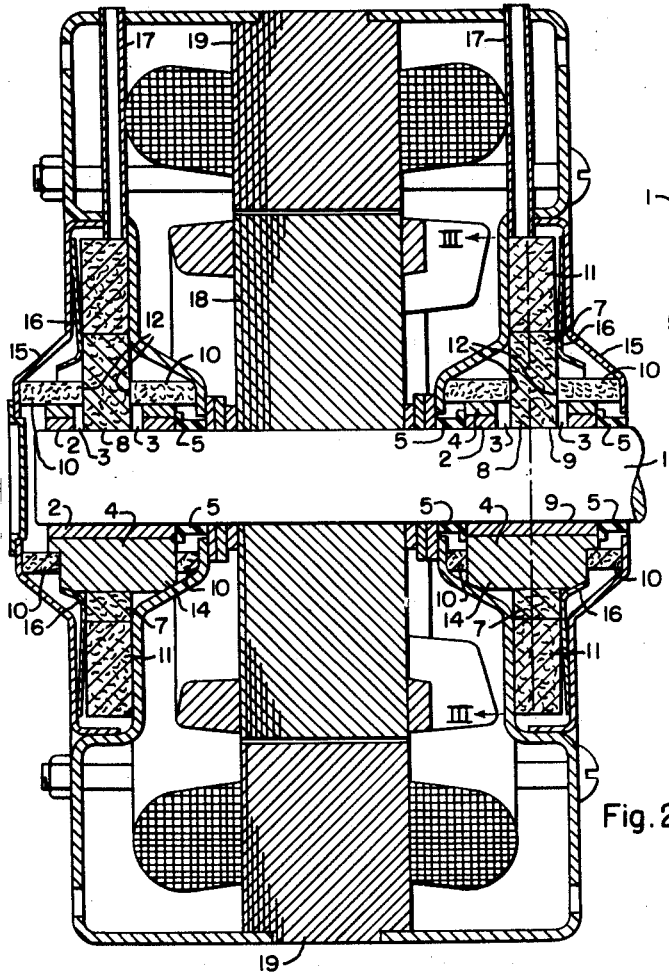
Fig. 2 is an illustrative embodiment of my invention in a dynamoelectric machine.

Fig. 2, right hand side, is an illustrative embodiment of my invention in a fractional horsepower motor, wherein all similar parts have been identified by the same reference numerals as in Fig. 1. The invention is shown in this figure, for the purpose of illustration, embodied in a self-aligning bearing of the type shown and described in a copending application of Donald L. Robinson, Serial No. 536,482, filed September 26, 1955, now Patent No. 2,845,552, issued July 29, 1958. It will be understood, however, that the present invention is not restricted in its application to self aligning bearings, but is generally applicable to any type of oil lubricated bearing.

A stator member, illustrated as including a stator core 19, with an end bracket 15 at either end thereof, encloses a rotating member shown as a squirrel cage rotor 18 mounted on a rotating shaft 1. The shaft 1 is supported in a sleeve type bearing 2 and bearing cup 4 which is provided with spherical surfaces engaging corresponding spherical seats formed in the end brackets 15 to give the desired self-aligning action. A retaining means, herein shown as a spring 16, holds the self-aligning sleeve bearing 2 in place in the end bracket 15. The oil return wick 10 is disposed around the self-aligning sleeve-type bearing 2 in the manner described previously with a continuous annular surface extending beyond the end of the bearing 2 and flingers 5. The oil feed wick 7 with its contacting tongue 8 is mounted over the oil return wick 10. The contacting tongue 8 makes contact with the rotating shaft 1 by protruding through an opening 12 within the oil return wick 10 and through the window 3 in the bearing 2 and bearing cup 4.

Figure 3:
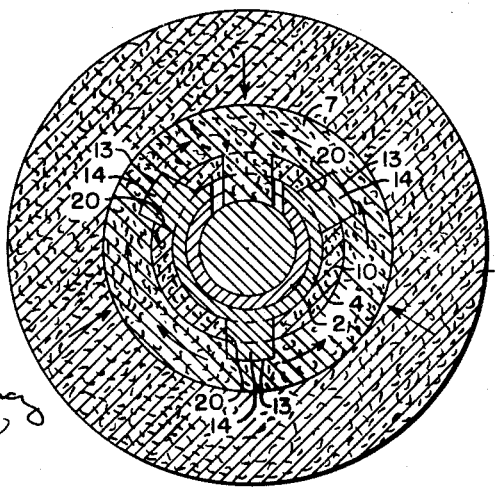
Fig. 3 is a fragmentary sectional view taken along the line III—III as indicated by the arrows in Fig. 2.

In operation, the lubricant oil return system functions as described in Fig. 1. The oil flow is as previously described and further shown in Fig. 3. The lubricant oil flow is from the feed wick 7 with its integral tongue 8 to the bearing clearance space 9 and along the rotating shaft 1 to the face of the flingers 5, where it gains a radial direction and force sufficient to reach the oil return wick 10 for capillary attraction back to the feed wick 7. The continuous annular surface extending beyond the end of the sleeve bearing 2 provides a maximum return area for the uniform absorption of the lubricant oil flung from the face of the flinger 5, regardless of what position the motor may be mounted in. A plurality of projections 14 on the self-aligning bearing cup 4 provides means for holding the oil return wick 10 and the feed wick 7 in position around the sleeve bearing 2 by protruding through openings 20 in the oil return wick and engaging recesses 13 in the oil feed wick 7. In this manner, the wicks are positively positioned about the self-aligning sleeve-type bearing 2. A reservoir wick 11 may be provided to supply additional oil to maintain a steady-state equilibrium for a satisfactory saturation level of the feed wick 7. Oiler tubes 17 located in the end brackets 15 may be provided for supplying additional oil when needed.

It is apparent that my invention has made possible the obtaining of a maximum lubricant oil return area at the ends of the sleeve bearing 2 and adjacent to the face of the flingers 5. The return area, being uniform and continuous around the outer diameter of the flingers 5, allows the dynamoelectric machine to be mounted in any position since gravity is only an insignificant part of the forces acting to return the lubricant oil to the feed wick 7. Further, the collection cavity external to the bearing cup in the usual construction which is a constant flooding hazard has been eliminated. Additional oil reservoir capacity can readily be added by the addition of more reservoir wicks 11' and 11'' depending upon the length of operating time desired without reoiling of the system. The adequate return area for the oil flow from the sleeve bearing 2 and the optional addition of more reservoir wicks provides the dynamoelectric machine with great flexibility and capacity for all sorts of operating conditions.

Although this invention has been described with certain degrees of particularlity, it is to be understood that my present disclosure has been made only by way of example and that numerous changes in the details, combination and arrangement of parts may be accomplished without departing from the spirit and scope of my invention. For instance, should the rotating shaft 1 not extend through the end bracket 15 in the dynamoelectric machine, as shown in Fig. 2, left hand side, the outboard flinger 5 may be omitted. In such a situation, with no shaft extension brought out of the dynamoelectric machine housing, the lubricant oil escaping from the sleeve bearing 2 will have no opportunity to travel along the rotating shaft 1 and thereby creep out of the machine. The lubricant oil thrown off at the end of the rotating shaft 1, acting as a flinger, will be directed by the end bracket 15 as well as the radial force imparted to it by the rotating shaft 1 to return to the oil return wick 10. The force of gravity also assists the return of lubricant oil to the oil return wick regardless of the position in which the machine may be mounted.

While I have illustrated my invention through the novel location of wicks in my oil lubricating return system, it is to be understood that any oil feeding means may be employed which is capable of supplying an adequate return area around the ends of the sleeve bearing 2 and beyond the lubricant oil flingers 5. Any oil receiving means permitting maximum return area plus proper flow of the lubricating oil may be utilized.

I claim as my invention:
1. In an oil lubricating system, a bearing supporting a shaft, said bearing having a window to said shaft, an oil return wick disposed circumferentially around said bearing, said oil return wick having an annular surface extending beyond the ends of the bearing, said oil return wick having an opening therethrough in alignment with said window, an oil feed wick positioned intermediate the ends of and disposed circumferentially around said oil return wick, said oil feed wick having a radial portion extending through said opening and window and making engagement with said shaft at the center of the bearing, said radial portion being in contact with the oil return wick in said opening, and at least one annular reservoir wick mounted on the outer periphery of said oil feed wick in contact therewith, the oil return wick and the reservoir wick being of lower density than the oil feed wick.

2. A dynamoelectric machine comprising a stator member and a rotor member, said stator member having an end bracket at each end thereof, said rotor member having a shaft extending through at least one of the end brackets, a self-aligning bearing mounted in each end bracket supporting said shaft and having a plurality of projections thereon having spherical surfaces cooperating with corresponding surfaces on said end bracket to self align itself within the end bracket, said bearing having a window to said shaft, an oil return wick disposed circumferentially around said bearing, said projections extending through the oil return wick to retain the wick in position, said oil return wick having an annular surface extending beyond the ends of the bearing, said oil return wick having an opening therethrough in alignment with said window, an oil feed wick positioned intermediate the ends of and disposed circumferentially around said oil return wick, said oil feed wick having a radial portion extending through said opening and window and making engagement with said shaft at the center of the bearing, said radial portion being in contact with the oil return wick in said opening, and at least one annular reservoir wick mounted on the outer periphery of said oil feed wick in contact therewith, the oil return wick and the reservoir wick being of less density than the oil feed wick.

3. A dynamoelectric machine comprising a stator member and a rotor member, said stator member having an end bracket at each end thereof and the rotor member having a shaft extending through at least one of the end brackets, a sleeve bearing mounted in each end bracket for supporting the shaft, flinger means on the shaft adjacent at least one end of each bearing, each bearing having an oil return wick disposed circumferentially around the bearing and extending axially beyond both ends of the bearing to provide a continuous annular surface extending past the flinger means to receive oil therefrom, an annular oil feed wick disposed over the oil return wick intermediate the ends of the bearing, said oil feed wick having a radial tongue extending through openings in the oil return wick and the bearing to engage the shaft, said tongue being in contact with the oil return wick, and at least one annular oil reservoir wick mounted on the outer periphery of the oil feed wick, the oil return wick and the oil reservoir wick being of lower density than the oil feed wick.

4. In combination, a sleeve bearing for supporting a rotatable shaft, flinger means on the shaft adjacent the ends of the bearing, oil return wicking extending axially of the bearing and providing continuous annular surfaces extending past the flinger means to receive oil therefrom, an oil feed wick having a portion extending through an opening in the bearing into engagement with the shaft, said extending portion of the oil feed wick being in contact with the oil return wick to receive oil therefrom, and oil reservoir wicking disposed in contact with a surface of the oil feed wick remote from said extending portion, said oil return wicking and oil reservoir wicking being of lower density than the oil feed wick.

References Cited in the file of this patent

UNITED STATES PATENTS

| | | |
|---|---|---|
| 2,306,743 | Morrill | Dec. 29, 1942 |
| 2,522,985 | Bradley | Sept. 19, 1950 |
| 2,685,658 | Eeiertag | Aug. 3, 1954 |
| 2,751,265 | Wightman | June 19, 1956 |